United States Patent [19]

Picton

[11] Patent Number: 4,827,962

[45] Date of Patent: May 9, 1989

[54] SAFETY VALVE

[76] Inventor: David J. Picton, 365 Point View Drive, Papatoetoe, Auckland, New Zealand

[21] Appl. No.: 186,634

[22] Filed: Apr. 27, 1988

[30] Foreign Application Priority Data

Apr. 28, 1987 [NZ] New Zealand .................. 220118

[51] Int. Cl.[4] ........................................... F16K 17/40
[52] U.S. Cl. ..................... 137/74; 122/504.1
[58] Field of Search .............. 137/72, 74; 122/504, 122/504.1

[56] References Cited

U.S. PATENT DOCUMENTS

| 768,383 | 8/1904 | Lockwood | 122/504.1 |
| 842,725 | 1/1907 | Taylor | 137/74 X |
| 1,520,126 | 12/1924 | Harrold | 137/74 X |
| 1,773,401 | 8/1930 | Lovekin | 122/501.1 |
| 2,001,686 | 5/1935 | Moore et al. | 122/501.1 |
| 2,047,654 | 7/1936 | Te Pas | 137/74 X |
| 2,210,555 | 8/1940 | Podolsky | 137/74 X |
| 3,735,773 | 5/1973 | Roksen | 137/74 |

Primary Examiner—John Rivell
Attorney, Agent, or Firm—Wegner & Bretschneider

[57] ABSTRACT

A hot water system has a aperture in the hot water line normally blocked by a liquid and gas filled vial which is sealed against the aperture to close it off. However, when hot water in the system reaches a predetermined temperature the expansion of the liquid in the vial fractures it, unblocking the aperture and allowing hot water to escape from the hot water line. Cold water coming into the cylinder will prevent any further temperature rise.

12 Claims, 3 Drawing Sheets

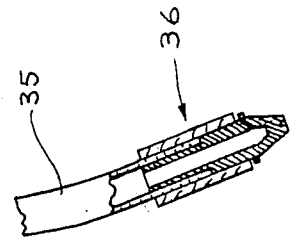
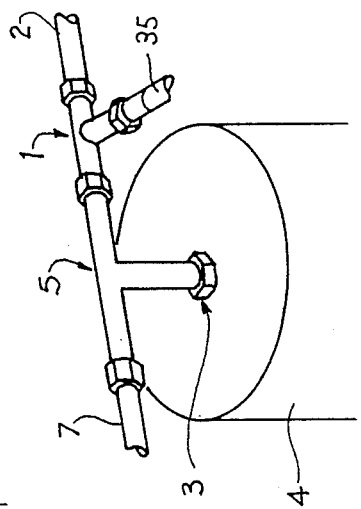
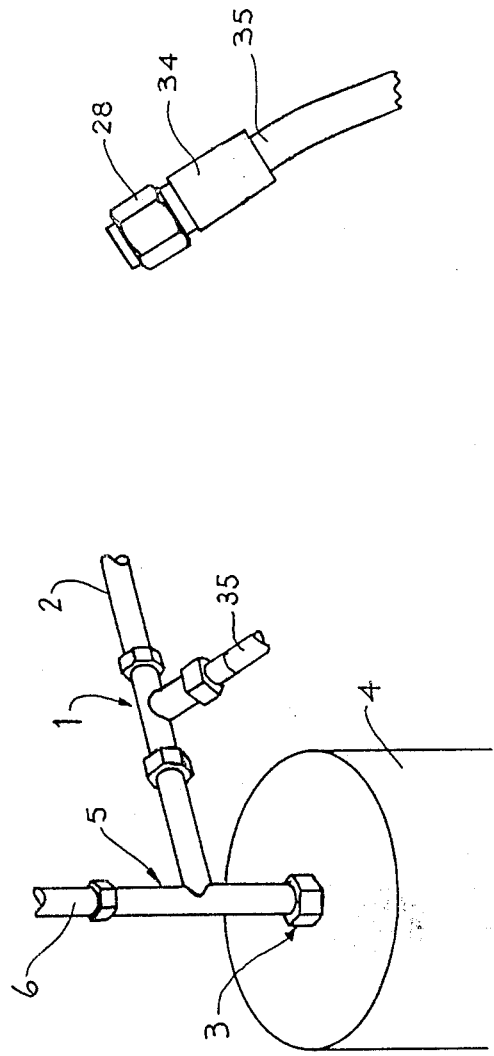

SAFETY VALVE

BACKGROUND OF THE INVENTION

This invention relates to a safety valve which is designed to eliminate the risk of excessively hot water or steam escaping from a hot water tap or other hot water outlet.

Although at the present time hot water cylinders must be fitted with some form of relief valve or open elevated vent which is designed to relieve or limit excessive pressure in the hot water cylinder, there have been instances where these valves have failed or the vents become blocked causing an explosion, and in some cases death. In other cases because of poor maintenance or poor design, there is insufficient protection against scalding by excessively hot water or steam emerging from a hot water outlet such as a tap or shower rose.

Devices have been used which admit cold water to the hot water line running from a hot water cylinder via a thermostatically-controlled valve to prevent excessive temperatures within the hot water line, but these will be useless if there is no cold water supply e.g. because of frozen pipes. These are also prone to becoming silted-up and to calcium deposits. Electrolytic corrosion can also be a problem.

Where polybutylene hose or pipe is used in a hot water plumbing system this is also particularly susceptible to damage of over-heated. While the pipe itself will withstand temperatures up to 95° C. it is found that, in practice, if a hot water system is heated above 80° C. the pipe can thin beneath the metal clamping rings which are usually used to fasten the pipe to fittings such as T-joints, elbows etc. The pipe does not regain its former thickness on cooling, thus resulting in loose fittings and consequent leakage.

The present invention was therefore devised with the objective of overcoming the above-mentioned disadvantages.

BRIEF SUMMARY OF THE INVENTION

In the first aspect the present invention consists in a safety valve comprising an in-line portion, an outlet from the in-line portion, a seat and a gas and liquid filled vial adapted to be located against the seat normally to block the outlet but being fracturable when heated to a predetermined temperature thus opening the outlet.

In the second aspect the present invention consists in a hot water system comprising a not water cylinder, a safety valve as set forth above located with its in-line portion in the hot water line from the cylinder, so that all hot water must pass through the in-line portion when it is passing to a tap or similar fitting.

In the third aspect the present invention consists in a hot water system having an aperture in the hot water line normally blocked by a liquid and gas filled vial sealed against the aperture and adapted to fracture when a predetermined temperature is reached to allow hot water to escape from the aperture.

BRIEF DESCRIPTION OF THE DRAWINGS

One preferred form of the present invention will now be described with reference to the accompanying drawings in which:

FIG. 1 shows a partial schematic view of an elevated vent type hot water cylinder fitted with a safety valve according to the present invention, FIG. 2 shows a partial schematic view of a pressure release valve type hot water cylinder fitted with a safety valve according to the present invention, FIG. 3 shows the end portions of a drain hose utilized with a safety valve according to the present invention.

DETAILED DESCRIPTION OF THE PREFERRED EMBODIMENT

Figure 4:
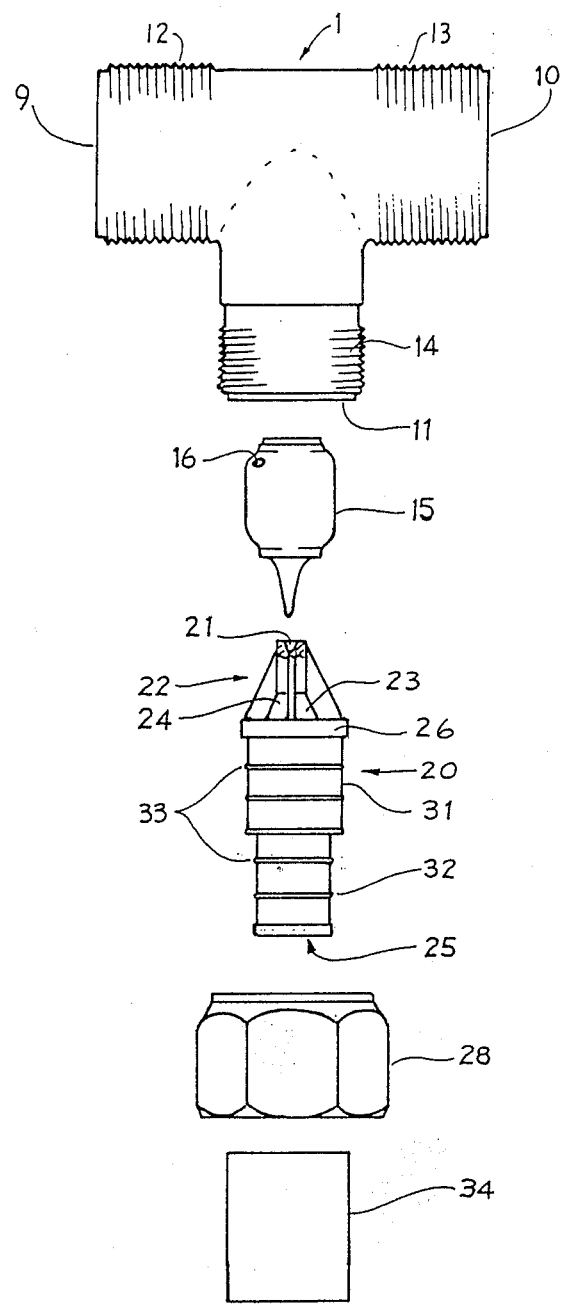
FIG. 4 shows an exploded side view of the safety valve.

In a preferred form of the present invention a safety valve 1 is incorporated in the hot water line 2 at a predetermined distance from the outlet 3 of a hot water cylinder 4. This is achieved by utilizing an equal arm length T-fitting 5 which facilitates the plumbing up of whichever is desired of the two usual arrangements shown in FIGS. 1 and 2. The T-fitting 5 would preferably be made of 20 millimeter nominal diameter copper pipe of preferably 110 millimeter arm length i.e. the fitting would have arms of equal length. The pipe 6 of FIG. 1 would lead to an elevated vent which limits the pressure maintainable in the hot water system by allowing steam and water to vent to waste if the temperature becomes excessive. Pipe 7 of FIG. 2 would lead to a pressure relief valve.

The safety valve 1 is itself preferably formed as a T-fitting, having two in-line arms 9 and 10 and an outlet arm 11, each of which is preferably threaded, preferably externally, such as at 12, 13 and 14. A vial 15 is filled with liquid apart from a small bubble 16 of gas. The vial 15 is adapted to be sealingly located against a seat 17 which surrounds an outlet or aperture 18 from the in-line portion of the valve formed by arms 9 and 10. The vial is held against the seat by a spacer 20 and thus normally blocks the outlet 18. However, if the temperature of the hot water in the in-line portion becomes greater than a predetermined temperature, the expansion of the liquid within the vial becomes sufficient, because of the small amount of resilience afforded by the small bubble 16, to fracture the vial which is preferably made of glass. The safety valve is arranged so that fractured portions of glass cannot block exit of hot water through the outlet arm 11. The glass vial is conveniently one which is used in sprinkler fire protection systems and a known vial for such a purpose fractures when its temperature reaches about 57° C. Although some health authorities recommend a maximum hot water temperature of 55° C. there is usually some heat loss as the water flows through the hot water system pipe work to an outlet such as a tap or shower rose. It is therefore preferable to allow for temperatures of 70° to 75° C. at the outlet 3 of the hot water cylinder. The T-portion 5 whether lagged or not and whichever way installed effectively leads to a known temperature drop in water flowing past the vial and standardises the distance of the vial from the cylinder outlet 3. The T-portion 5 also is a good conductor and minimises thermal shock to the vial and the chance of an unintended fracture.

The water temperature as it flows past the vial may exceed 57° C. and typically will be up to 70° to 75° C. before the vial will fracture as not all of the vial is in contact with the hot water. The vial will not fracture until its average temperature is about 57° C. In some commercial installations it may be desirable to have greater or lesser permissible maximum temperatures in which case vials with different nominal fracture temperatures would be used e.g. a 68° C. fracture point which would permit a maximum water temperature of about 95° C.

A spacer 20 is provided with a depression 21 in its nose portion 22 which is substantially conical in shape, but is provided with four "cut-away" portions such as 23 and 24 through what would otherwise be a thick conical wall. It will be appreciated that such "cut-away" portions are actually formed by suitably shaped parts of dies used to injection mould the spacer out of plastics material. The "cut-away" portions form part of a passage for water through the spacer and communicate with the hollow bore 25 which passes through the spacer spigots 31 and 32.

Any suitable means of perforating the spacer so that water can flow through it would be suitable, but it will be appreciated that any fragments of glass from a fractured vial must be kept clear enough of the through passage to allow sufficient hot water to flow out of the safety valve and through the spacer.

In normal use where there is a cold water supply which is operative to the hot water cylinder, one only needs to allow 15 percent of the hot water to escape out of the safety valve as incoming cold water will very quickly reduce the temperature within the hot water cylinder beyond the heat output of the normal largest heating element of 3 kw. For this reason the outlet arm 11 would normally be of 15 millimeters nominal diameter, whereas the in-line arms 9 and 10 would be 20 millimeters nominal diameter.

Figure 5:
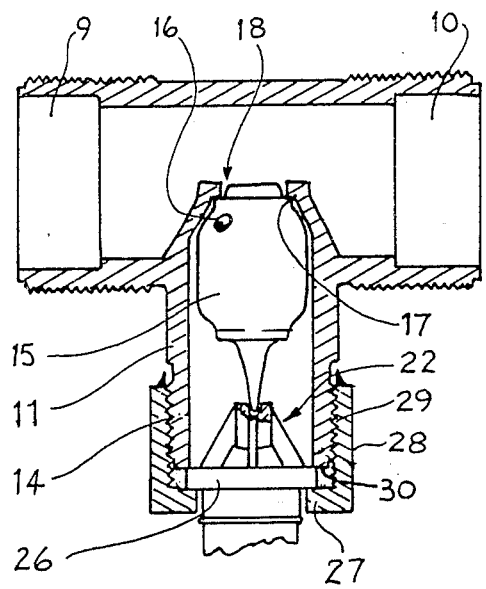
FIG. 5 shows a partial, central cross-section through an assembled safety valve.
Figure 6:
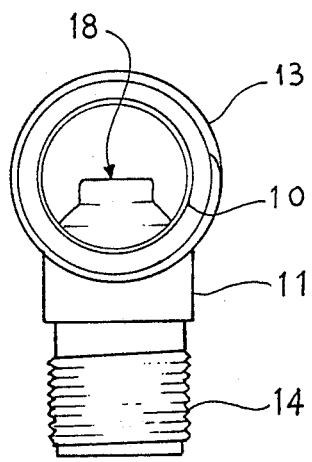
FIG. 6 shows an end view of part of a safety valve.

The spacer 20 includes a flange 26 which coacts with an inwardly directed flange 27 of a cap nut 28 which is internally threaded at 29 to coact with threaded portion 14 of the outlet arm 11. Thus, when the cap nut is screwed up it presses the flange 26 against end 30 of the outlet arm 11 as shown in FIG. 5. The height of the nose 22 is chosen so that the vial 15 is forced against the seat 17 with the proper amount of pressure to effect a seal even where the hot water system is what is known as a high-pressure system which may operate at 850 kpa (123 psi). (At such a high pressure the boiling point of water is about 177° C.)

The arm portions 9, 10 and 11 of the safety valve are preferably made by polysulfone which is both temperature resistant and affords a suitable self-seal with the vial 15.

The spacer 20 has spigot portions of two different diameters. Spigot portion 31 is of larger diameter than spigot portion 32. Both the spigot portions are provided with ribs such as 33. These help to effect a seal. In use a ferrule 34 which is preferably made of aluminium is clamped around the spigot portion 31, a sufficient distance from the flange 26 to allow for the thickness of the flange 27 of the cap nut 28. The spacer component would normally be supplied from the factory with the union nut fitted and the ferrule clamped around the spigot portion 31. As well the cap nut 28 would be factory-fitted to arm 11 and deformed to prevent removal. This prevents the wrong type of vial being installed by way of repair. On installation the plumber would insert polybutylene hose pipe 35 over the spigot 32 within the ferrule 34 and would crimp the ferrule 34 over the hose and spigot 32 to effect a seal to the hose pipe 35 as is shown in FIG. 3. A further spacer 20 with factory-fitted ferrule would be fitted by the plumber to form a drain assembly 36 at the waste end of the drain hose 35 as is shown in FIG. 3. The fitting of such a spacer helps to ensure that the end of the drain hose remains open and unblocked. It helps restrict access into it by insects, such as mason bees, which have been known to block pipe work by depositing soil within the pipe.

The glass vial is resistant to coating with deposits such as calcium, which are typically present in water, and the flow of water past the seat during normal everyday use means that silting-up cannot occur. As the safety valve is made of plastics and glass there are no electrolysis problems.

It is essential to install the outlet arm 11 and drain hose 35 so that no cold water can find its way to the back of the vial to cool it.

Instead of using a spacer and nut to hold the vial against the seat it could be permanently glued in place.

What I claim is:

1. A safety valve comprising an in-line portion through which fluid flows during normal operation, an outlet from the in-line portion, a seat and a gas and liquid filled vial adapted to be located against the seat normally to block the outlet but being fracturable when heated to a predetermined temperature thus opening the outlet, at least a portion of the vial projecting into said in-line portion.

2. A safety valve as claimed in claim 1 when the vial is a glass vial adapted to fracture when heated to a uniform temperature of substantially 57° C.

3. A safety valve as claimed in claim 1 wherein the valve is formed as a T-fitting, having two in-line arms and one outlet arm, each of which is threaded and the vial is located in the outlet arm, said portion projecting into the in-line arms.

4. A safety valve as claimed in claim 3, wherein the seat projects into the in-line arms and each of said in-line arms is externally threaded.

5. A safety valve comprising an in-line portion, an outlet from the in-line portion, a seat, a gas and liquid filled vial adapted to be located against the seat normally to block the outlet but being fracturable when heated to a predetermined temperature thus opening the outlet, a spacer which presses the vial against the seat and which has a flange, and a cap nut which forces the flange of the spacer against an end of the outlet arm, said cap nut having internal threads which cooperate with threads of the outlet arm, said spacer having a passage for liquid through it.

6. A safety valve as claimed in claim 5 wherein the spacer includes hollow spigot portions of two different diameters, the larger diametered portion lying adjacent to the flange, and having sealingly swaged onto it a metal ferrule, part of which projects over at least some of the smaller diameter portion of the spigot.

7. A safety valve as claimed in claim 6 wherein both spigot portions include circumferential sealing ribs.

8. A safety valve as claimed in claim 5 wherein the spacer include a head which is substantially cone-shaped with locating means for the vial and cut-away portions through the walls of the cone through part of the passage.

9. A hot water system comprising a hot water cylinder, a safety valve comprising an in-line portion, an outlet from the in-line portion, a seat and a gas and liquid filled vial adapted to be located against the seat normally to block the outlet but being fracturable when heated to a predetermined temperature thus opening the outlet, at least a portion of the vial projecting into the in-line portion, said safety valve being located with its in-line portion in the hot water line from the cylinder, so that all hot water must pass through the in-line portion when it is passing to as tap or similar fitting.

10. A hot water system as claimed in claim 9, wherein there is a T-fitting of equal arm length between the safety valve and the hot water cylinder outlet.

11. A hot water system as claimed in claim 9 wherein the vial is adapted to fracture if the temperature of the water leaving the hot water cylinder outlet exceeds 70° C.

12. A hot water system comprising a hot water line having an aperture therein, said aperture being normally blocked by a liquid and gas filled vial sealed against the aperture, said vial projecting into the hot water line and adapted to fracture when a predetermined temperature is reached to allow hot water to escape from the aperture.

* * * * *

UNITED STATES PATENT AND TRADEMARK OFFICE
CERTIFICATE OF CORRECTION

PATENT NO. : 4,827,962

DATED : May 9, 1989

INVENTOR(S) : David J. Picton

It is certified that error appears in the above-identified patent and that said Letters Patent is hereby corrected as shown below:      Title page:

[76]   Inventor:  David J. Picton, 356 Point View Drive, Papatoetoe, Auckland, New Zealand Signed and Sealed this Sixteenth Day of October, 1990

*Attest:*

HARRY F. MANBECK, JR.

*Attesting Officer*      *Commissioner of Patents and Trademarks*